United States Patent
Margel et al.

(10) Patent No.: US 11,301,496 B2
(45) Date of Patent: Apr. 12, 2022

(54) USING ACCESS LOGS FOR NETWORK ENTITIES TYPE CLASSIFICATION

(71) Applicant: Imperva, Inc., Redwood City, CA (US)

(72) Inventors: Shiri Margel, Petak Tikva (IL); Yury Geiler, Holon (IL)

(73) Assignee: Imperva, Inc., San Mateo, CA (US)

( * ) Notice: Subject to any disclaimer, the term of this patent is extended or adjusted under 35 U.S.C. 154(b) by 96 days.

(21) Appl. No.: 16/233,074

(22) Filed: Dec. 26, 2018

(65) Prior Publication Data

US 2020/0210455 A1    Jul. 2, 2020

(51) Int. Cl.
| | | |
|---|---|---|
| G06F 15/173 | (2006.01) | |
| G06F 16/28 | (2019.01) | |
| H04L 43/04 | (2022.01) | |
| H04L 29/06 | (2006.01) | |

(52) U.S. Cl.
CPC ............ *G06F 16/285* (2019.01); *H04L 43/04* (2013.01); *H04L 63/1416* (2013.01); *H04L 63/1425* (2013.01)

(58) Field of Classification Search
CPC ... H04L 43/04; H04L 29/06; H04L 29/08072; H04L 63/1416; H04L 63/1425; G06F 16/285
See application file for complete search history.

(56) References Cited

U.S. PATENT DOCUMENTS

| | | | | |
|---|---|---|---|---|
| 7,376,969 B1* | 5/2008 | Njemanze | ............... | G06F 21/55 709/224 |
| 7,748,614 B2* | 7/2010 | Brown | ................. | G06Q 20/102 235/379 |
| 7,809,826 B1* | 10/2010 | Guruswamy | ......... | H04L 43/026 709/224 |
| 9,621,431 B1* | 4/2017 | Cardente | ............... | H04L 41/147 |
| 9,830,340 B2* | 11/2017 | Gradin | .................... | G06F 16/21 |
| 2003/0233458 A1* | 12/2003 | Kwon | ..................... | H04L 29/06 709/227 |
| 2007/0162596 A1* | 7/2007 | Sekiguchi | ........... | H04L 43/0811 709/224 |
| 2009/0319659 A1* | 12/2009 | Terasaki | .............. | H04L 63/1416 709/224 |

(Continued)

OTHER PUBLICATIONS

Khnaser E., "How to Design an Effective Naming Convention," Virtual Insider, Oct. 13, 2011, downloaded from: https://virtualizationreview.com/blogs/virtual-insider/2011/10/how-to-design-an-effective-naming-convention.aspx?p=1 on Jul. 14, 2018, 6 pages.

(Continued)

*Primary Examiner* — Razu A Miah
(74) *Attorney, Agent, or Firm* — Nicholson, De Vos, Webster & Elliott, LLP

(57) ABSTRACT

A method by a security system implemented by one or more electronic devices for detecting attacks on one or more databases hosted by one or more database servers. The method includes classifying, based on analyzing database logs of the one or more databases, a plurality of network entities used to access the one or more databases into different network entity types, where one or more of the plurality of network entities can be classified into the same network entity type and using a result of the classification of the plurality of network entities to detect attacks on the one or more databases.

18 Claims, 5 Drawing Sheets

(56) References Cited

U.S. PATENT DOCUMENTS

| | | | |
|---|---|---|---|
| 2010/0250712 A1* | 9/2010 | Ellison | G06F 3/04847 709/219 |
| 2011/0179162 A1* | 7/2011 | Mayo | H04L 67/02 709/224 |
| 2011/0289589 A1* | 11/2011 | Kayashima | G06F 21/552 726/26 |
| 2012/0191676 A1* | 7/2012 | Kester | G06F 11/3476 707/694 |
| 2013/0291100 A1* | 10/2013 | Ganapathy | H04W 12/126 726/22 |
| 2013/0312081 A1* | 11/2013 | Shim | H04L 63/1425 726/13 |
| 2014/0229617 A1* | 8/2014 | Cyr | H04L 67/02 709/224 |
| 2015/0058993 A1* | 2/2015 | Choi | G06N 7/005 726/25 |
| 2015/0106933 A1* | 4/2015 | Lee | H04L 63/1416 726/23 |
| 2015/0128205 A1* | 5/2015 | Mahaffey | H04L 63/105 726/1 |
| 2015/0215231 A1* | 7/2015 | Liu | H04L 45/14 709/213 |
| 2015/0269380 A1* | 9/2015 | Golovanov | H04L 63/1475 726/24 |
| 2015/0341246 A1* | 11/2015 | Boubez | H04L 41/0883 709/224 |
| 2016/0036924 A1* | 2/2016 | Koppolu | H04L 43/10 709/224 |
| 2016/0080212 A1* | 3/2016 | Ramachandran | H04L 45/306 370/338 |
| 2016/0080502 A1* | 3/2016 | Yadav | H04L 47/22 709/227 |
| 2016/0359872 A1* | 12/2016 | Yadav | H04L 63/1425 |
| 2017/0063897 A1* | 3/2017 | Muddu | G06F 3/04847 |
| 2017/0257376 A1* | 9/2017 | Dulkin | H04L 63/0807 |
| 2017/0331674 A1* | 11/2017 | Wang | H04L 41/0654 |
| 2018/0026999 A1* | 1/2018 | Ruvio | H04L 63/145 726/23 |
| 2018/0150647 A1* | 5/2018 | Naqvi | G06F 21/602 |
| 2018/0234461 A1* | 8/2018 | Mahaffey | H04L 63/18 |

OTHER PUBLICATIONS

"User Address Book Attributes," Microsoft Docs, May 31, 2018, downloaded from: https://docs.microsoft.com/en-us/windows/desktop/ad/address-book-properties on Jul. 23, 2018, pp. 1-3.

"User Naming Attributes," Microsoft Docs, May 31, 2018, downloaded from: https://docs.microsoft.com/en-us/windows/desktop/ad/naming-properties on Jul. 23, 2018, pp. 1-3.

"User Security Attributes," Microsoft Docs, May 31, 2018, downloaded from: https://docs.microsoft.com/en-us/windows/desktop/ad/security-properties on Jul. 23, 2018, pp. 1-8.

* cited by examiner

Classify, based on analyzing database logs of the one or more databases, a plurality of network entities used to access the one or more databases into different network entity types, where one or more of the plurality of network entities can be classified into the same network entity type (310)

Using the result of the classification of the network entities to detect database attacks on the one or more databases (320)

Figure 3

USING ACCESS LOGS FOR NETWORK ENTITIES TYPE CLASSIFICATION

TECHNICAL FIELD

Embodiments of the invention relate to the field of database security, and more specifically, to detecting attacks on databases based on the type of network entity accessing those databases.

BACKGROUND ART

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

Database security tools typically implement various security rules to protect databases. These security rules attempt to distinguish between legitimate database activities and suspicious database activities. Databases can be accessed by different types of network entities within an enterprise. For example, a database may be accessed by personal clients (e.g., a database client), application servers, jump servers, and database servers. Different types of network entities are expected to access the databases in a different manner.

Conventional database security tools typically use the same set of security rules for protecting a given database regardless of the type of network entity that is accessing the database. However, this "one-size-fits-all" approach can be ineffective since different types of database activities can be considered suspicious for one network entity type but considered normal for another network entity type due to the differences in the manner in which the different network entity types are expected to access the database.

BRIEF DESCRIPTION OF THE DRAWINGS

The invention may best be understood by referring to the following description and accompanying drawings that are used to illustrate embodiments of the invention. In the drawings:

FIG. 3 is a flow diagram of a process for detecting attacks on databases based on the type of network entity accessing those databases, according to some embodiments.

DETAILED DESCRIPTION

Figure 1:
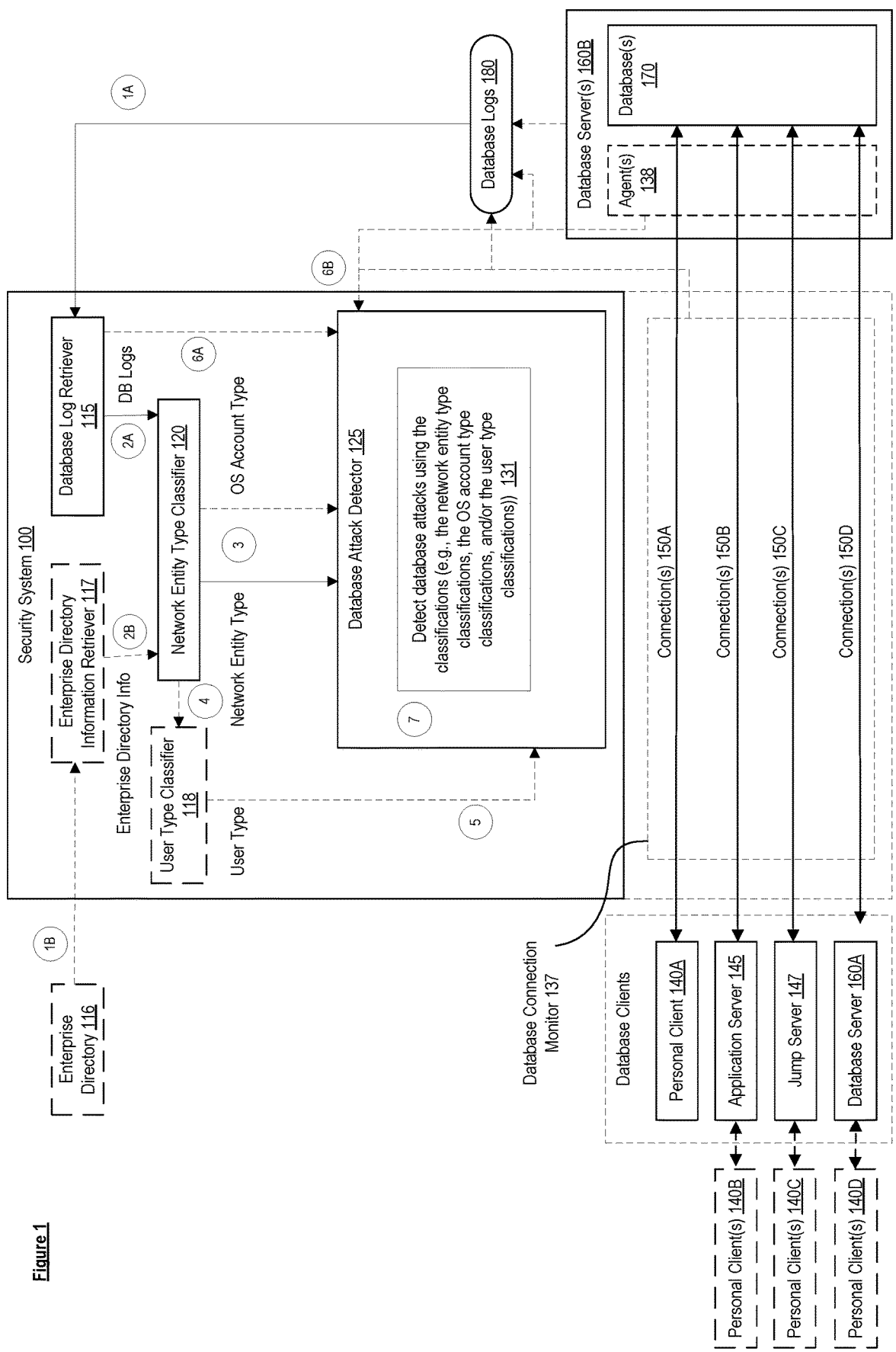
FIG. 1 is a block diagram illustrating a system for detecting attacks on databases based on the type of network entity accessing those databases, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various embodiments are described herein for detecting attacks on databases based on the type of network entity accessing those databases. Embodiments classify network entities into different network entity types based on analyzing database logs. The different network entity types may include a personal client entity type, a jump server entity type, an application server entity type, and a database server entity type. Embodiments may apply different security rule(s) to different database accesses depending on the type of network entity performing those database accesses. This may result in a more accurate identification of suspicious database activities (e.g., attacks) and/or reduce the number of false positives compared to conventional approaches such as the "one-size-fits-all" approach mentioned above.

While embodiments may use one or more databases implemented according to one or more of the different database models previously described, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs.

FIG. 1 is a block diagram illustrating a system for detecting attacks on databases based on the type of network entity accessing those databases, according to some embodiments. As shown in the diagram, the system includes personal client 140A, personal client(s) 140B, 140C, and 140D, an application server 145, a jump server 147, database servers 160A and 160B, and a security system 100. Database server 160B hosts database(s) 170 which may include one or more database objects (not shown). The database(s) 170 may be implemented according to a variety of different models (e.g., relational, non-relational, graph, columnar, object, tabular, tuple store, and multi-model). In an embodiment where the database(s) 170 are implemented according to a relational model (i.e., database(s) 170 are relational databases), the database objects in the database(s) 170 may be database tables that include one or more records called rows. However, in embodiments where the database(s) 170 are implemented according to a different model (e.g., non-relational model), the database(s) 170 may include database objects and records that are implemented using a different storage/organization scheme.

Personal clients 140 are client applications that are intended for individual use (e.g., used by a single human user at a time). Personal client 140A is a database client that establishes one or more database connections 150A to one or more of the database(s) 170 hosted by database server 160B. Personal client(s) 140B are application clients that interact with application server 145 to access an application hosted by application server 145. As part of satisfying requests received from personal client(s) 140B, application server 145 establishes one or more database connections 150B to one or more of the database(s) 170 hosted by database server 160B. Personal client(s) 140C are database clients that access the database(s) 170 hosted by database server 160B via jump server 147. Jump server 147 is a server that acts as a relay between security zones. As part of relaying requests received from personal client(s) 140C, jump server 147 establishes one or more database connections 150C to one or more of the database(s) 170 hosted by database server 160B. Personal client(s) 140D are database clients that interact with database server 160A to access databases hosted by database server 160A. As part of satisfying requests received from personal client(s) 140D, database server 160A establishes one or more database connections 150D to one or more of the database(s) 170 hosted by database server 160B.

Personal client 140A, application server 145, jump server 147, and database server 160A may submit requests (e.g., Structured Query Language (SQL) queries) to one or more of the database(s) 170 hosted by database server 160B over their respective database connections 150. These requests could include, for example, requests to read one or more records from a specified database object, modify one or more records of a specified database object, and/or delete one or more records from a specified database object. Personal client 140A, application server 145, jump server 147, and database server 160A may also receive responses to the requests over their respective database connections 150. The responses could include, for example, an indication of success, a value, and/or one or more tuples. Personal client 140A, application server 145, jump server 147, and database server 160A are thus network entities (e.g., in an enterprise network) that access the database(s) 170 hosted by database server 160B, and thus can be considered as database clients with respect to database server 160B, and are referred to herein as such. The network entities can be implemented using one or more electronic devices and can be implemented using dedicated physical hardware or using virtual machines.

In one embodiment, database server 160B generates and stores database logs 180. The database logs 180 include log entries that record the database activity of the database(s) 170 hosted by database server 160B (e.g., transactions made against the database(s) 170 and/or interactions between database clients and the database(s) 170), which can include the request/query and/or the response/query result side of database transactions. In one embodiment, the database logs 180 are stored in database server 160B (or near database server 160B), while in other embodiments, the database logs 180 are stored separately from database server 160B (e.g., in a remote file server).

The database logs 180 can include various attributes pertaining to the database activity of the database(s) 170. In one embodiment, the database logs 180 include one or more of the following attributes: host name, operating system (OS) user name, time of transaction, source Internet Protocol (IP) address, destination IP address, database user name, application name, an indication of whether the access was local, the operation performed, and the number of queries submitted. These attributes are provided by way of example and not intended to be limiting. It should be understood that the database logs 180 can include other attributes.

In one embodiment, the security system 100 includes a database connection monitor 137. The database connection monitor 137 monitors the database connections 150 established with the database(s) 170 of database server 160B (e.g., database connections 150A, 150B, 150C, and 150D). In one embodiment, the database connection monitor 137 is implemented within a security gateway that sits inline between the database clients (e.g., personal client 140A, application server 145, jump server 147, and database server 160A) that access database server 160B (on the communication path between the database clients and database server 160B). In other embodiments, the database connection monitor 137 taps into (or "sniffs") the communications between the database clients and database server 160B without sitting inline. Thus, the database connection monitor 137 is able to see the traffic that is sent over the database connections 150.

In one embodiment, database server 160B includes database agent(s) 138. A database agent (sometimes referred to simply as "agent") is a piece of software typically installed locally to (or near) the database(s) 170 that monitors the database activity of those database(s) 170. For example, the database agent(s) 138 may be configured such that it sees the traffic to the database(s) 170 (e.g., requests/queries submitted to the database(s) by database clients) as well as the responses to the requests/queries (e.g., an indication of success, a value, one or more tuples, etc.). In some embodiments, each database has a dedicated database agent 138 that monitors accesses to that database, while in other embodiments, there is a separate database agent 138 for each database vendor type (e.g., separate database agents 138 for Oracle databases, MySQL databases, and Mongo databases). While the diagram shows the database agent(s) 138 being implemented in database server 160B, in other embodiments, the database agent(s) 138 may be implemented outside of database server 160B. In one embodiment, the database agent(s) 138 are implemented as loadable kernel components that are configured to see the traffic being sent to and from the database(s) 170 hosted by database server 160B.

In one embodiment, the database connection monitor 137 and/or the database agent(s) 138 generate log entries that record the database activity of the database(s) 170 hosted by database server 160B (e.g., based on the interactions/traffic it sees between the database clients and the database(s) 170) and stores these as part of database logs 180. Thus, the database logs 180 can be generated by any combination of database server 160B, the database connection monitor 137, and the database agent(s) 138. As mentioned above, these database logs 180 can include various attributes pertaining to the database activity of the database(s) 170.

As shown in the diagram, the security system 100 includes a database log retriever 115 (also referred to as a database log collector). The database log retriever 115 can retrieve database logs 180 generated by database server 160B, database connection monitor 137, and/or the database agent(s) 138. In one embodiment, the database log retriever 115 requests the database logs 180 from the entity that hosts the database logs 180 (e.g., database server 160B or a remote file server), while in another embodiment, the database logs 180 are "pushed" to the database log retriever 115 (e.g., periodically and/or as new database logs 180 become available).

In one embodiment, the security system 100 includes an enterprise directory information retriever 117. The enterprise directory information retriever 117 can retrieve enterprise directory information maintained in an enterprise directory 116 (e.g., Microsoft Active Directory®). The enterprise directory information may include various attributes regarding network entities and/or users in an enterprise network. In one embodiment, the enterprise directory information may include one or more of the following attributes: computer name, login name, first name, last name, manager name, email address, employee ID, employee number, whether a thumbnail/picture exists, an indication of whether "password never expires" is turned on, OS account is in "ManagedServiceAccount" folder (or other folder/list that indicates the managed service accounts), OS name, and distinguished name (e.g., describing the position of the network entity or user in a directory information tree). These attributes are provided by way of example and not intended to be limiting. It should be understood that the enterprise directory information can include other attributes.

As shown in the diagram, the security system 100 includes a network entity type classifier 120. As will be described further herein below, the network entity type classifier 120 can classify network entities based on analyzing the database logs 180. In some embodiments, the network entity type classifier 120 may classify network entities further based on analyzing enterprise directory information. In one embodiment, the network entity type classifier 120 classifies network entities as being a personal client, an application server, a jump server, or a database server. In one embodiment, the network entity type classifier 120 also classifies OS accounts based on analyzing the database logs 180 and/or the enterprise directory information. For example, the network entity type classifier 120 may classify OS accounts as being a human OS account or a service OS account. A human OS account is type of OS account that is designated to be used by a human interacting with the OS. A service OS account is a type of OS account that is designated to be used by an application/service interacting with the OS.

In one embodiment, the security system further includes a user type classifier 118. As will be described further herein below, the user type classifier 118 may classify users as being an interactive user or a non-interactive user. An interactive user is a type of user that that submits ad-hoc queries generated directly by a human interacting with an application (or a script/code that emulates a human interacting with an application). A non-interactive user is a type of user that submits queries generated indirectly by a human interacting with an application (e.g., pre-defined queries formed by a business application). As will be described in further detail below, the database attack detector 125 may use one or more of the network entity type classification, OS account type classification, and the user type classification to detect attacks on the database(s) 170.

Exemplary operations for detecting attacks on databases based on the type of network entity accessing those databases will now be described with reference to the diagram. At circle 1A, the database log retriever 115 retrieves the database logs 180 (which could include various information regarding database activity seen by database server 160B, the database connection monitor 137, and/or the database agent(s) 138). In one embodiment, at circle 1B, the enterprise directory information retriever 117 retrieves enterprise directory information from the enterprise directory 116.

At circle 2A, the database log retriever 115 provides the retrieved database logs to the network entity type classifier

120. In one embodiment, at circle 2B, the enterprise directory information retriever 117 provides the retrieved enterprise directory information to the network entity type classifier 120.

The network entity type classifier 120 may analyzes the database logs 180 (and also the enterprise directory information in some embodiments) to classify one or more network entities appearing in the database logs 180 into network entity types. In one embodiment, network entities appearing in the database logs 180 can be uniquely identified based on their host names. The host name attribute in the database logs 180 may correspond to the computer name attribute in the enterprise directory information. It should be understood, however, that network entities appearing in the database logs 180 can be identified using other attributes as well such as IP address (e.g., if the host name attribute is not available in the database logs). In one embodiment, the network entity type classifier 120 classifies network entities into one of the following network entity types: client entity type, application server entity type, jump server entity type, and database server entity type.

In one embodiment, the network entity type classifier 120 classifies network entities in two stages. In the first stage, the network entity type classifier 120 classifies one or more network entities that it is able to classify based on analyzing the database logs and/or the active directory information. In some cases, the network entity type classifier 120 may not be able to classify all of the network entities appearing in the database logs 180 in the first stage (e.g., because there is insufficient information regarding some of the network entities). In the second stage, the network entity type classifier 120 may classify one or more of the network entities that were not classified in the first stage using a clustering mechanism. These stages are further described herein below.

As mentioned above, in the first stage, the network entity type classifier 120 classifies network entities based on analyzing the database logs (and the active directory information in some embodiments). The network entity type classifier 120 may classify network entities based on various features of those network entities that it extracts/determines from analyzing the database logs and/or the active directory information. These features may hint at the network entity's type. Several exemplary features are described herein below.

In one embodiment, the application that the network entity uses to access the database(s) 170 can hint at the network entity's type. For example, if a network entity uses the "rman" application (a recovery manager application) to access a database, then this may suggest that the network entity is a database server. As another example, if a network entity uses the "oraagent" application (Oracle® agent), then this may suggest that the network entity is a database server.

In one embodiment, the type of OS accounts that the network entity uses to access the database(s) 170 can hint at the network entity's type. For example, if the network entity uses an service OS account to access a database over a long period of time, then this may suggest that the network entity is a database server. In one embodiment, as will be further described herein below, the OS account types of OS accounts can be determined from analyzing the database logs 180 and/or enterprise directory information.

In one embodiment, the number and type of simultaneous OS accounts that the network entity uses to access the database(s) 170 can hint at the network entity's type (OS account activity). For example, if the network entity uses a single human OS account to access the database(s) 170, then this may suggest that the network entity is a personal client. However, if the network entity uses multiple human OS accounts simultaneously to access the database(s) 170, then this may suggest that the network entity is a jump server.

In one embodiment, the number of IP addresses used by the network entity and simultaneous usage of IP addresses to access the database(s) 170 can hint at the network entity's type (IP address activity). For example, if the network entity uses multiple IP addresses over a period of time, but not simultaneously, this may suggest that the network entity is a personal client. This is because using multiple IP addresses, but not simultaneously, suggests that the network entity is using Dynamic Host Configuration Protocol (DHCP), which is typically used by personal clients (and not by servers).

In one embodiment, the IP address used by the network entity to access the database(s) 170 and its similarity to other IP addresses can hint at the network entity's type (IP address convention). For example, if the network entity uses an IP address that is similar to the known IP address of database server 160B (e.g., an IP address that is in the same subnet as database server 160), then this may suggest that the network entity is also a database server. As another example, if the source IP address used by the network entity is the same as the destination IP address used by the network entity, then this may suggest that the network entity is a database server (since the destination IP address of a database access is typically the IP address of a database server).

In one embodiment, the number of queries submitted by the network entity can hint at the network entity's type. For example, if the network entity submits a large number of queries, then this may suggest that the network entity is not a personal client (but is a server).

In one embodiment, keywords in the OS user name of the OS account used by the network entity to access the database (s) 170 and/or the host name of the network entity can hint at the network entity's type (textual hints). For example, if the OS user name and/or the host name includes the keywords "prd" (production) or "app" (application) this may suggest that the network entity is an application server. As another example, if the OS user name and/or the host name includes the keywords "ctx" (a common abbreviation for Citrix®, which is a company engaged in providing tools for secure access via jump servers) or "jmp" (jump) this may suggest that the network entity is a jump server.

In one embodiment, keywords in the OS name (or absence thereof) of the OS used by the network entity can hint at the network entity's type. For example, if the OS name (from the enterprise directory 116) does not include the keyword "server," then this may suggest that the network entity is a personal client.

In one embodiment, keywords in the distinguished name attribute of the network entity (from the enterprise directory 116) can hint at the network entity's type. The distinguished name uniquely identifies an entry (e.g., for a network entity and/or a user) and describes its position in a directory information tree (similar to a file path in a file system). If the distinguished name includes the keyword "server," for example, then this may suggest that the network entity is a server (and not a personal client).

Thus, the network entity type classifier 120 may classify network entities based on features of those network entities extracted from the database logs 180 and/or enterprise directory information. The network entity type classifier 120 may analyze the database logs 180 and/or enterprise directory information using a rule-based algorithm or using a classification model that has been trained using machine learning, as will be further described with reference to FIG. 4. The network entity type classifier 120 may be able to classify network entities more accurately if it has database logs 180 that cover a relatively long period of time (e.g., database logs 180 that cover the past 60 days). Thus, the network entity type classifier 120 may analyze database logs 180 that cover a relatively long period of time (e.g., past 60 days) when classifying network entities.

As mentioned above, in the second stage, the network entity type classifier 120 may classify one or more of the network entities that were not classified in the first stage using a clustering mechanism. In one embodiment, the network entity type classifier 120 clusters network entities into groups based on their host names (e.g., network entities having the same host name prefix and/or suffix may be clustered into the same group—the network entity type classifier 120 may determine the length of the prefix/suffix to use when performing the clustering) and assigns the same network entity type to network entities that are clustered into the same group. For example, the network entity type classifier 120 may cluster network entities having host names "w14263," "14264," "w14265," "w14640," and "w14684" into the same group since they each have a host name with the prefix "w14*" (where "*" is a wildcard match). It is assumed in this example that the network entity type classifier 120 classified network entities "w14263," "w14264," and "w14265" as being application servers during the first stage of the classification but was not able to classify network entities "w14640" and "w14684" with enough confidence. Since network entities "w14640" and "w14684" are clustered into the same group as network entities that were classified as application servers, the network entity type classifier 120 may assign the same network entity type (i.e., application server) to network entities "w14640" and "w14684."

In one embodiment, the network entity type classifier 120 analyzes the database logs 180 (and also the enterprise directory information in some embodiments) to classify OS accounts appearing in the database logs 180 into OS account types. In one embodiment, OS accounts appearing in the database logs 180 can be uniquely identified based on their OS user names. The OS user name attribute in the database logs 180 may correspond to the login name attribute in the enterprise directory information. In one embodiment, the network entity type classifier 120 classifies OS accounts into one of the following OS account types: human OS account type and service OS account type.

Similar to the network entity type classification described above, in one embodiment, the network entity type classifier 120 classifies OS accounts in two stages. In the first stage, the network entity type classifier 120 classifies one or more OS accounts it is able to classify based on analyzing the database logs 180 and/or the active directory information. The network entity type classifier 120 may not be able to classify all of the OS accounts appearing in the database logs 180 in the first stage (e.g., because there is insufficient information regarding some OS accounts). In the second stage, the network entity type classifier 120 may classify one or more of the OS accounts that were not classified in the first stage using a clustering mechanism. These stages are further described herein below.

As mentioned above, in the first stage, the network entity type classifier 120 classifies OS accounts based on analyzing the database logs 180 and/or the active directory information. The network entity type classifier 120 may classify OS accounts based on various features of those OS accounts that it extracts/determines from analyzing the database logs 180 and/or the active directory information. These features may hint at the OS account's type. Several exemplary features are described herein below.

In one embodiment, the existence of the first name and/or last name of the OS account (in the enterprise directory 116) in a dictionary of human names can hint at the OS account's type. For example, if the first name and/or the last name exists in a predefined dictionary of human names, then this may suggest the OS account is a human OS account. In one embodiment, if the OS account also has an email address (in the enterprise directory 116), then this further suggests that the OS account is a human OS account.

In one embodiment, the existence of one or more of login name, first name, last name, manager name, email address, employee ID, employee number, and/or thumbnail/picture exists attributes in the enterprise directory information can hint at the OS account's type. For example, if one or more of the above-mentioned attributes exist in the enterprise directory information (i.e., there is a legitimate value for these attributes in the enterprise directory 116), then this may suggest that the OS account is a human OS account.

In one embodiment, keywords or symbols in the OS user name of the OS account can hint at the OS account's type. For example, if the OS user name has the suffix "S," then this may suggest that the OS account is a service OS account. As another example, if the OS user name includes one or more of the keywords "srv," "svc," "service," "test," "tst," "dev," and "ctx," then this may suggest that the OS account is a service OS account.

In one embodiment, the number of queries generated by the OS account can hint at the OS account's type. For example, if the OS account generates a large number of queries, then this may suggest that the OS account is a service OS account. In contrast, if the OS account generates a small number of queries, then this may suggest that the OS account is a human OS account.

In one embodiment, the password never expires attribute and/or the OS accounts in "ManagedServiceAccount" folder attribute can hint at the OS account's type. For example, if either of these attributes is set ("turned on"), then this may suggest that the OS account is a service OS account.

Thus, the network entity type classifier 120 may classify OS accounts based on features of those OS accounts extracted from the database logs 180 and/or enterprise directory information. The network entity type classifier 120 may analyze the database logs 180 and/or enterprise directory information using a rule-based algorithm or using a classification model that has been trained using machine learning, as will be further described with reference to FIG. 4. The network entity type classifier 120 may be able to classify OS accounts more accurately if it has database logs 180 that cover a relatively long period of time (e.g., database logs 180 that cover the past 60 days). Thus, the network entity type classifier 120 may analyze database logs 180 that cover a relatively long period of time (e.g., past 60 days) when classifying OS accounts.

As mentioned above, in the second stage, the network entity type classifier 120 may classify one or more of the OS accounts that were not classified in the first stage using a clustering mechanism. In one embodiment, the network entity type classifier 120 clusters OS accounts into groups based on their OS user names (e.g., OS accounts having the same OS user name prefix and/or suffix may be clustered into the same group) and assigns the same OS account type to OS accounts that are clustered into the same group.

Returning to FIG. 1, at circle 3, the network entity type classifier 120 provides the network entity type classifications (and also the OS account type classifications in some embodiments) to the database attack detector 125. As will be described further herein below, the database attack detector 125 may detect attacks on the database(s) 170 using the network entity type classifications (and the OS account type classifications).

In one embodiment, at circle 4, the network entity type classifier 120 also provides the network entity type classifications and OS account type classifications to the user type classifier 118. The user type classifier 118 can analyze the database logs 180 to classify a user accessing the database(s) 170 as being an interactive user or a non-interactive user (e.g., an application). As used herein, an interactive user refers to a user that accesses the database(s) 170 using requests/queries that are defined/formed ad-hoc by a human user (such queries are sometimes referred to as user generated queries or non-application generated queries). A non-interactive user is a user that accesses a database 170 using predefined requests/queries (e.g., defined/formed by a business application). In one embodiment, the user type classifier 118 may identify/define a user in the database logs 180 using a combination of application name, source IP address, destination IP address, host name, OS user name, and database user name. The user type classifier 118 may classify a user as being an interactive user or a non-interactive user based on a variety of factors such as, but not limited to, the name of the client application that is being used to access the database(s) 170, the driver being used to connect to the database(s) 170, the types of requests/queries that are being submitted by the user to the database(s) 170, the amount of data being sent over database connections 150, and/or the frequency of requests/queries being submitted to the database(s) 170.

In one embodiment, the user type classifier 118 classifies users based on the network entity types of the network entities used by those users and/or the OS account types of the OS accounts used by those users. For example, if a user uses a network entity that was classified as a personal client to access the database(s) 170, then this may suggest that the user is an interactive user. However, if a user uses a network entity that was classified as an application server, then this may suggest that the user is a non-interactive user. As another example, if a user uses an OS account that was classified as a human OS account, then this may suggest that the user is an interactive user. However, if a user uses an OS account type that was classified as a service OS account, then this may suggest that the user is a non-interactive user. The user type classifier 118 may be able to determine the user types more accurately if it has a longer transaction history (e.g., an audit history) for the databases 170. Thus, similar to the network entity type classifier 120, the user type classifier 118 may analyze log entries that cover a relatively long period of time (e.g., past 60 days).

In one embodiment, at circle 5, the user type classifier 118 provides the user type classifications to the database attack detector 125. As will be described further herein below, the database attack detector 125 may detect attacks on the database(s) 170 using the user type classifications.

In one embodiment, at circle 6A, the database log retriever 115 provides the database logs 180 to the database attack detector 125. These database logs 180 are the logs that the database attack detector 125 is to inspect for attacks or suspicious database activity and they generally cover a relatively short period of time (e.g., last 24 hours) compared to the database logs 180 that are analyzed by the network entity type classifier 120 and the user type classifier 118. Additionally or alternatively, at circle 6B, the database connection monitor 137 and/or the agent(s) 138 provides monitored database access attempts to the database attack detector 125. The database attack detector 125 may inspect these database access attempts (or other information collected by the database attack detector 125 and/or the database agent(s) 138) for attacks. Thus, depending on the implementation, the database attack detector 125 may detect attacks by inspecting the database logs 180 provided by the database log retriever 115 and/or the database access attempts monitored by the database connection monitor 137 and/or the database agent(s) 138.

In one embodiment, the database attack detector 125 detects attacks on the database(s) 170 using the network entity type classifications (e.g., produced by the network entity type classifier 120 and provided to the database attack detector 125 at circle 3). For example, the database attack detector 125 may apply different sets of security rule(s) to different database accesses (e.g., seen from the database logs 180 and/or from the database access attempts monitored by the database connection monitor 137 and/or the database agent(s) 138) depending on the network entity types of the network entities used to perform the different database accesses. For example, if a network entity accessing the database(s) 170 has been classified as a personal client, then the database attack detector 125 may apply a set of security rule(s) to database accesses made/attempted using that network entity that are designed to detect database activity that is suspicious for personal clients (e.g., database activity that is unexpected for personal clients such as accessing a database that is normally only accessed by application servers). Similarly, if the network entity accessing the database(s) 170 has been classified as an application server, then the database attack detector 125 may apply a set of security rule(s) to database accesses made/attempted using that network entity that are designed to detect database activity that is suspicious for application servers (e.g., database activity that is unexpected for application servers). The database attack detector 125 may apply security rule(s) in a similar manner to detect suspicious database activity for other network entity types (e.g., for jump servers and database servers).

Additionally or alternatively, the database attack detector 125 may detect attacks on the database(s) 170 using the OS account type classifications (e.g., produced by the network entity type classifier 120 and provided to the database attack detector 125 at circle 3) and/or the user type classifications (e.g., produced by the user type classifier 118 and provided to the database attack detector 125 at circle 5). Thus, at circle 7, the database attack detector 125 may detect attacks using any combination of the network entity type classifications, the OS account type classifications, and the user type classification (e.g., as shown in block 131).

For example, if a database table of a database 170 has been previously accessed by an OS service account, then the database attack detector 125 may mark the database table as being an application database table (e.g., a database table that is meant to be accessed by applications as opposed to humans). The database attack detector 125 may then generate an alert if an interactive user (e.g., a human user) accesses this database table.

As another example, the database attack detector 125 may keep track of the number of records that are extracted from a database server by a specific human OS account using a specific network entity. The database attack detector 125 may then generate an alert if the number of records extracted from the database server by that specific human OS account using that specific network entity exceeds the typical amount for that human OS account using that specific network entity. In the case that the network entity is classified as a jump server, the database attack detector 125 may profile the number of records that are extracted from the database server by the specific human OS account across all network entities that are classified as jump servers. This will result in a more accurate profiling and detection of suspicious database activity.

As yet another example, the database attack detector 125 may generate an alert if a network entity classified as a database server accesses (or attempts to access) another database server (as this may impose a security risk). The number of database servers in some enterprises is very large, which can lead to situations where certain database servers go unmonitored because the enterprise is unaware of the existence of those database servers. In one embodiment, the database attack detector 125 (or other component within the security system 100) may notify the enterprise (e.g., an administrator) regarding the network entities that have been classified as database servers. The enterprise then may take appropriate action to monitor those database servers, as needed.

As yet another example, in some cases, information regarding the OS accounts that access a database is not available. In this case, if the database access was made/attempted using a network entity classified as a personal client, then this may suggest that the database access was made/attempted by an interactive user. The database attack detector 125 may thus generate an alert if a network entity classified as a personal client accesses an application database table (or other database table that is not expected to be accessed by an interactive user).

As yet another example, if a database account was previously accessed using an OS service account, then the database attack detector 125 may mark the database account as being an application database account (e.g., a database account that is meant to be used by applications as opposed to humans). The database attack detector 125 may then generate an alert if an interactive user (e.g., a human user) uses this database account to access a database.

As yet another example, the database attack detector 125 may generate an alert if an interactive user provides invalid login information to a database server more than a certain number of times within a given time interval.

Thus, as illustrated by the examples described above, the database attack detector 125 may detect attacks on the database(s) 170 using the network entity type classifications, the OS account type classifications, and/or the user type classifications. The alerts generated by the database attack detector 125 can be sent to the appropriate entity, which in some embodiments can be an administrator, a storage location for storing a history of alerts/events, and/or an alert/event analytics tool that performs further analysis on the generated alerts/events. The various examples described above are provided for illustrative purposes and not intended to limit the ways that the database attack detector 125 can use the various classifications to detect attacks. It should be understood that the database attack detector 125 can use the various classifications in other ways to detect attacks.

One or more of the components of the security system 100 can be implemented by one or more electronic devices, and can be implemented using software, hardware, or a combination of both. In some embodiments, one or more components of the security system 100 can be implemented in an on-premise secure server (e.g., of the enterprise that hosts database server 160B) and/or a cloud. For example, the database log retriever 115, the enterprise directory information retriever 117, the network entity type classifier 120, the user type classifier 118, the database attack detector 125, or any combination thereof may be implemented in a cloud. While a certain configuration of the security system 100 is shown in the diagrams, it should be understood that the configuration is shown by way of example, and not intended to be limiting. Other embodiments may utilize a different configuration. For example, the database attack detector 125 can be implemented as part of the database connection monitor 137 and/or implemented as part of the database agent(s) 138 (instead of being implemented in the security system 100).

Figure 2:
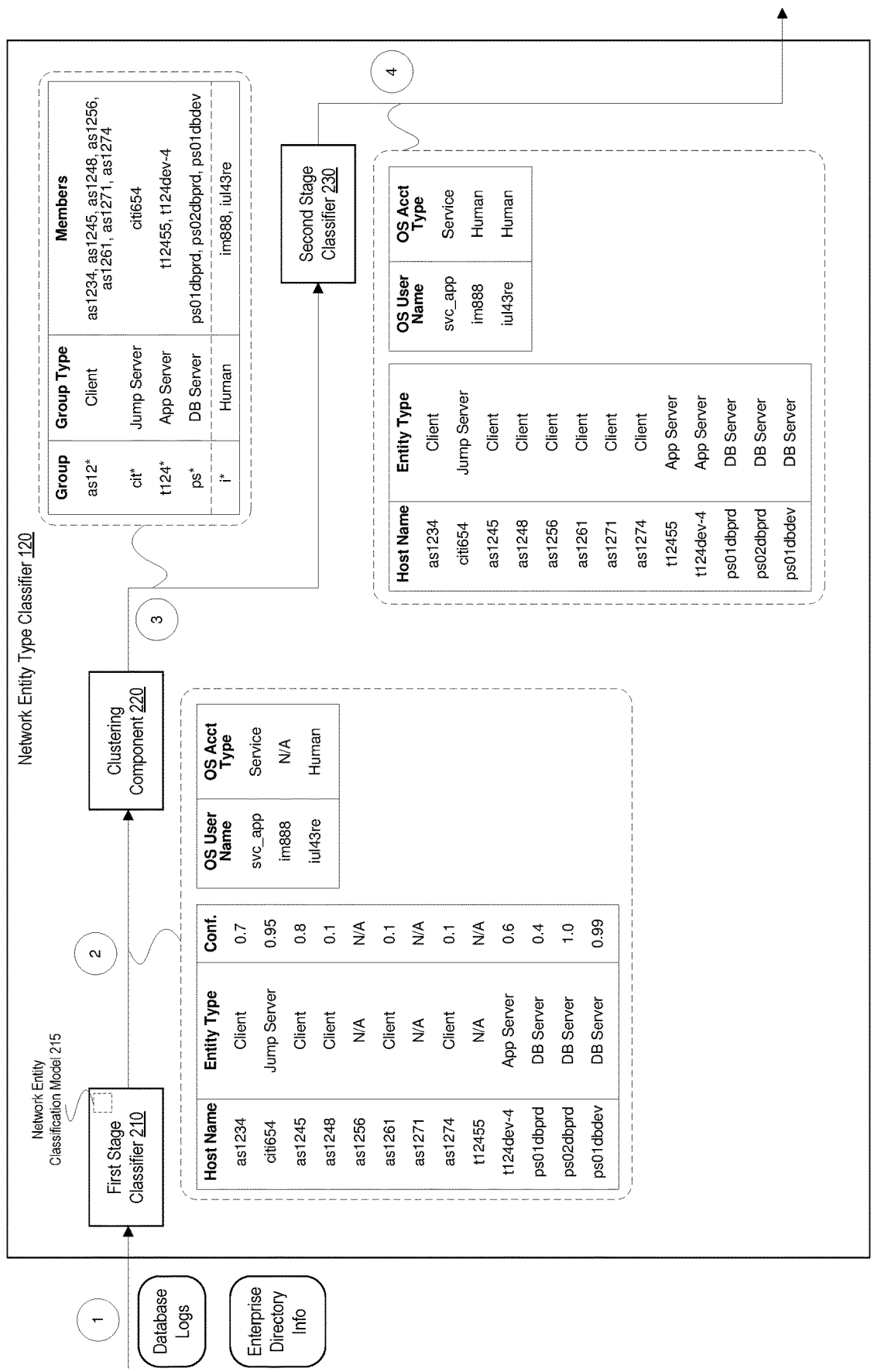
FIG. 2 is a block diagram illustrating the internals components of a network entity type classifier, according to some embodiments.

FIG. 2 is a block diagram illustrating the internals components of a network entity type classifier, according to some embodiments. As shown in the diagram, the network entity type classifier 120 includes a first stage classifier 210, a clustering component 220, and a second stage classifier 230. The first stage classifier 210 receives database logs and enterprise directory information (e.g., provided by the database log retriever 115 and the enterprise directory information retriever 117, respectively) as input. The first stage classifier 210 analyzes the database logs and the enterprise directory information to classify network entities into network entity types and to classify OS accounts into OS account types. In one embodiment, the first stage classifier 210 includes a network entity classification model 215 that has been trained using machine learning to classify network entities and/or OS accounts. The network entity classification model 215 may classify network entities and/or OS accounts using one or more features of the network entities and/or OS accounts extracted from the database logs and/or enterprise directory information, as described above. Details of how the network entity classification model 215 can be trained is described further herein below with reference to FIG. 4. The first stage classifier 210 outputs the network entity type of each network entity it was able to classify and the OS account type of each OS account it was able to classify. In some cases, the first stage classifier 210 may not be able to classify one or more network entities and/or OS accounts. For example, in the example shown in the diagram, the first stage classifier 210 was not able to classify network entities "as1256," "as1271," and "t12455" and OS account "im888." In one embodiment, the first stage classifier 210 also outputs a confidence value for each classification. The confidence value may indicate how confident the first stage classifier 210 is regarding a classification. In one embodiment, the confidence value ranges from 0 to 1, where 0 indicates the lowest confidence and 1 indicates the highest confidence. Thus, as shown in the diagram, the first stage classifier 210 may output host name, entity type, and a confidence value for each network entity. Also, the first stage classifier 210 may output OS user name and OS account type for each OS account.

The first stage classifier 210 provides its output to the clustering component 220. The clustering component 220 clusters network entities into groups based on host name and clusters OS accounts into groups based on OS user name. In this example, network entities having a host name prefix of "as12*" are clustered into the same group, network entities having a host name prefix of "cit*" are clustered into the same group, network entities having a host name prefix of "t124*" are clustered into the same group, and network entities having a host name prefix of "ps*" are clustered into the same group (where "*" represents a wildcard match). Also, in this example, OS accounts having a OS user name prefix of "i*" are clustered into the same group. The clustering component 220 assigns a group type to each group.

The clustering component 220 may assign the group type for a group based on the network entity types or OS account types of the network entities or OS accounts in that group (as determined by the first stage classifier 210). For example, the clustering component 220 may assign the group type for a group based on the most common network entity type or OS account type of the network entities or OS accounts that are members of that group. In this example, group "as12*" is assigned a group type of personal client, group "cit*" is assigned a group type of jump server, group "t124*" is assigned a group type of application server, and group "ps*" is assigned a group type of database server. Also, group "i*" (which is a group of OS accounts) is assigned a group type of human OS account. As shown in the diagram, the clustering component 220 outputs group, group type, and group members of the groups formed by the clustering component 220.

The clustering component 220 provides its output to the second stage classifier 230. The second stage classifier 230 assigns the group type to all of the network entities and/or OS accounts in the group that were not classified by the first stage classifier 210. For example, in the example shown in the diagram, the first stage classifier 210 was not able to classify network entity "as1271." However, the second stage classifier 230 classifies network entity "as1271" as a personal client since it is clustered into the same group as other network entities that the first stage classifier 210 classified as personal clients. As another example, the second stage classifier 230 classifies OS account "im888" as a human OS account since it is clustered into the same group as another OS accounts (i.e., OS account "iu143re") that the first stage classifier 210 classified as a human OS account. As shown in the diagram, the second stage classifier 230 outputs host name, and entity type for each network entity and also outputs OS user name and OS account type for each OS account. The network entity type classifier 120 may output these classification results (e.g., to be used by the database attack detector 125 and/or the user type classifier 118).

FIG. 3 is a flow diagram of a process for detecting attacks on databases based on the type of network entity accessing those databases, according to some embodiments. In one embodiment, the process is implemented by a security system (e.g., security system 100). The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Also, while the flow diagram shows a particular order of operations performed by certain embodiments, it should be understood that such order is exemplary (e.g., alternative embodiments may perform the operations in a different order, combine certain operations, overlap certain operations, etc.).

At block 310, the security system classifies, based on analyzing database logs of the one or more databases, a plurality of network entities used to access the one or more databases into different network entity types, where one or more of the plurality of network entities can be classified into the same network entity type.

At block 320, the security system uses a result of the classification of the plurality of network entities to detect database attacks. Additionally or alternatively, as described above, the security system may classify OS accounts and/or users, and use the results of these classifications to detect attacks on the one or more databases.

Figure 4:
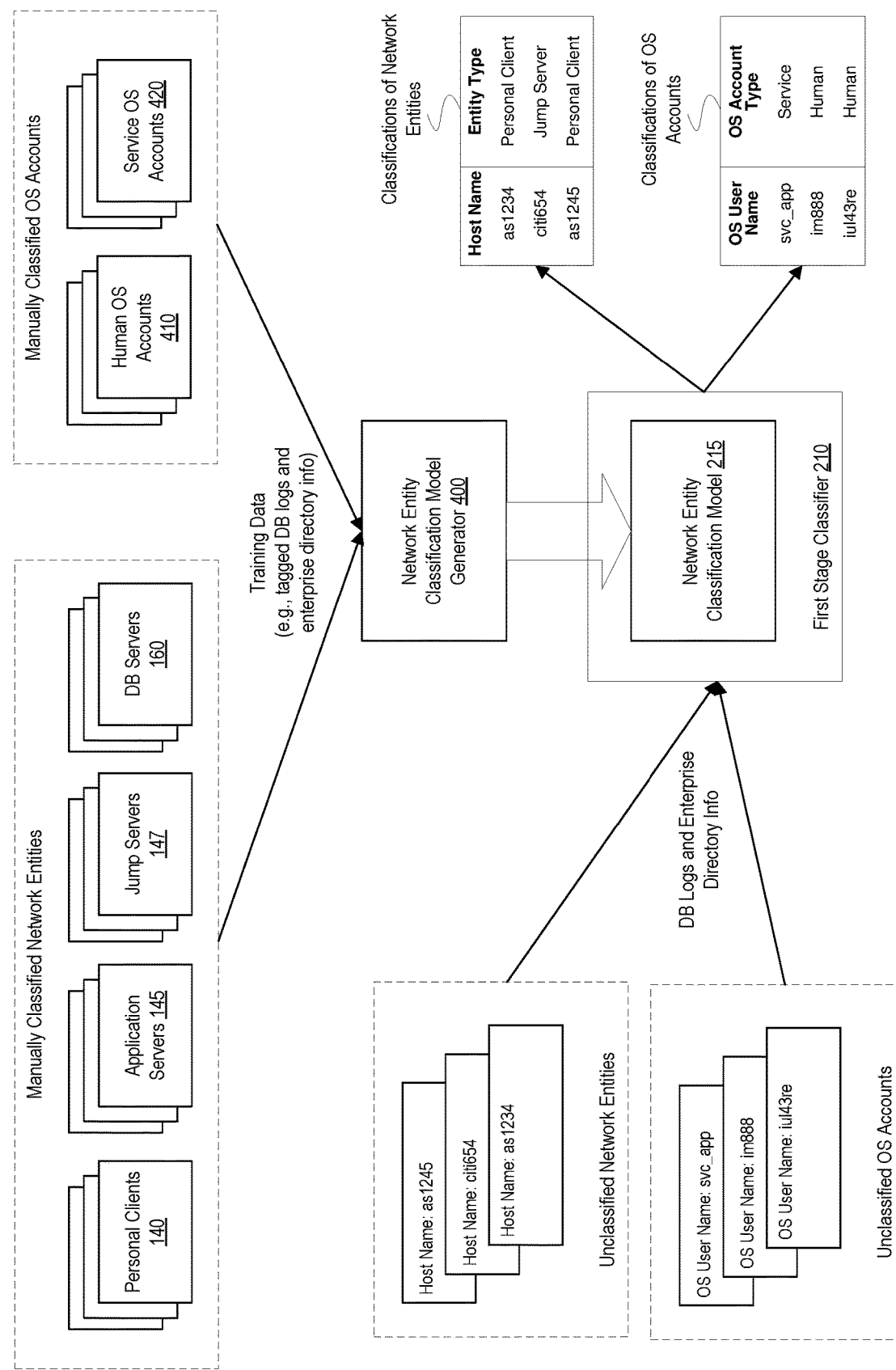
FIG. 4 is a block diagram illustrating a network entity classification model generator generating a network entity classification model, according to some embodiments.

FIG. 4 is a block diagram illustrating a network entity classification model generator generating a network entity classification model, according to some embodiments. As shown in the diagram, the network entity classification model generator 400 receives training data as input. The training data may include database logs and enterprise directory information that are tagged with information regarding manually classified network entities (or other network entities for which the network entity types is known) and manually classified OS accounts (or other OS accounts for which the OS account type is known). For example, the network entity classification model generator 400 may receive database logs and enterprise directory information that are tagged with information regarding the known network entity types of the network entities appearing in the database logs 180 (e.g., where the network entity type can be a personal client 140, application server 145, jump server 147, or database server 160) and the known OS account types of the OS accounts appearing in the database logs 180 (e.g., where the OS account type can be human OS account 410 or service OS account 420). The network entity classification model generator 400 may use the training data to generate and train (e.g., using machine learning techniques) a network entity classification model 215. While in one embodiment, the network entity classification model generator 400 uses a supervised machine learning algorithm (e.g., random forest tree or gradient boosting tree (e.g., using XGBoost)) to train the network entity classification model 215, in other embodiments, the network entity classification model generator 400 can use an unsupervised machine learning algorithm. The network entity classification model 215 may include a set of decision trees or neural networks for classifying network entities and/or OS accounts based on their features extracted from the training data. These features can include one or more of the features described above that hint at the network entity's type and/or the OS account's type.

The first stage classifier 210 may use the network entity classification model 215 to classify network entities. For example, the first stage classifier 210 may receive the database logs and enterprise directory information that include transactions/entries pertaining to unclassified network entities and/or unclassified OS accounts and provide this data to the network entity classification model 215. The network entity classification model 215 may classify the network entities and the OS accounts based on analyzing the database logs 180 and the enterprise directory information and output the results of the classification, which is also the output of the first stage classifier 210. For example, in the example shown in the diagram, the first stage classifier 210 receives database logs and enterprise directory information that include transactions/entries pertaining to network entities "as1245," "citi654," and "as1234" and OS accounts "svc_app," "im888," and "iu143re." The network entity classification model 215 of the first stage classifier 210 may classify these network entities and OS accounts based on analyzing the database logs 180 and enterprise directory information (e.g., based on extracting/determining features of the network entities and OS accounts from the database logs 180 and enterprise directory information). The first stage classifier 210 may then output the results of the classifications. In this example, network entity "as1234" has been classified as a personal client, network entity "citi654" has been classified as a jump server, and network entity "as1245" has been classified as a personal client. Also, OS account "svc_app" has been classified as a service OS account, OS account "im888" has been classified as a human OS account, and OS account "iu143re" has been classified as a human OS account.

Figure 5:
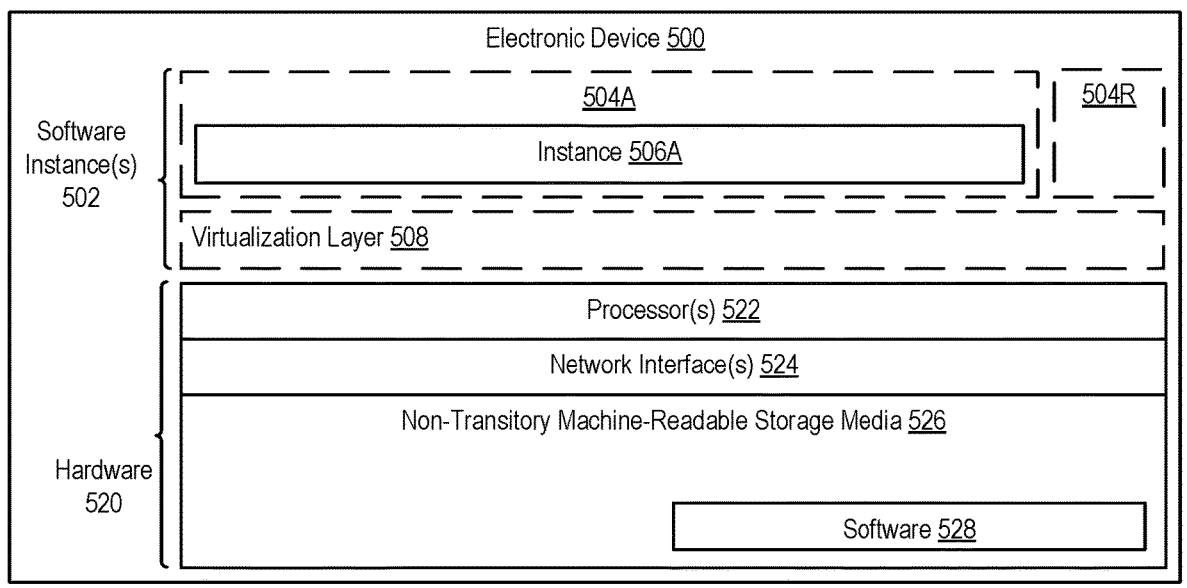
FIG. 5 is a block diagram illustrating an electronic device, according to some embodiments.

FIG. 5 is a block diagram illustrating an electronic device, according to some embodiments. FIG. 5 includes hardware 520 comprising a set of one or more processor(s) 522, a set of one or more network interfaces 524 (wireless and/or wired), and non-transitory machine-readable storage media 526 (or computer-readable storage media) having stored therein software 528 (which includes instructions executable by the set of one or more processor(s) 522). Software 528 can include code, which when executed by hardware 520, causes the electronic device 500 to perform operations of one or more embodiments described herein. Thus, one or more components of the security system 100 (e.g., database log retriever 115, enterprise directory information retriever 117, network entity type classifier 120, user type classifier 118, database attack detector 125, and database connection monitor 137) may be implemented in one or more electronic devices. Also, personal clients 140, application server 145, jump server 147, and database servers 160 may be implemented in one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting

What is claimed is:
1. A method by a security system implemented by one or more electronic devices for detecting attacks on one or more databases hosted by one or more database servers, the method comprising:
 classifying, based on analyzing database logs of the one or more databases, each of a plurality of network entities used to access the one or more databases over database connections established by the plurality of network entities with the one or more databases into one of a plurality of network entity types;
 using a result of the classification of the plurality of network entities to detect attacks on the one or more databases by applying different sets of security rules to different accesses to the one or more databases depending on the network entity types of the network entities used to perform the different accesses; and
 classifying, based on analyzing the database logs of the one or more databases, a plurality of operating system (OS) accounts used to access the one or more databases into different OS account types, wherein the different OS account types include a human OS account type and a service OS account type, wherein the human OS account type is a type of OS account that is designated to be used by a human interacting with the OS, wherein the service OS account type is a type of OS account that is designated to be used by an application interacting with the OS, wherein one or more of the plurality of OS accounts can be classified into the same OS account type, and wherein a result of the classification of the plurality of OS accounts is used to detect attacks on the one or more databases.

2. The method of claim 1, wherein the plurality of network entity types includes a personal client entity type, a jump server entity type, an application server entity type, and a database server entity type.

3. The method of claim 1, wherein the classifying each of the plurality of network entities is based on one or more of the following features determined from analyzing the database logs: applications used to access a database, operating system (OS) account types used to access a database, OS account activity, Internet Protocol (IP) address activity, IP address convention, number of queries, and existence of predefined keywords.

4. The method of claim 1, wherein the classifying each of the plurality of network entities is also based on analyzing enterprise directory information maintained in an enterprise directory.

5. The method of claim 1, wherein the classifying each of the plurality of network entities is also based on clustering the plurality of network entities into groups based on host name and assigning the same network entity type to network entities clustered into the same group.

6. The method of claim 1, wherein the classifying the plurality of OS accounts is also based on analyzing enterprise directory information maintained in an enterprise directory.

7. The method of claim 6, wherein the classifying the plurality of OS accounts is based on determining whether first name and last name attributes of the plurality of OS accounts indicated by the enterprise directory information match names in a predefined dictionary of human names.

8. The method of claim 1, wherein the classifying the plurality of OS accounts is also based on clustering the plurality of OS accounts into groups based on OS user name and assigning the same OS account type to OS accounts clustered into the same group.

9. The method of claim 1, further comprising:
classifying, based on the network entity types of the plurality of network entities and the OS account types of the plurality of OS accounts, a plurality of users that access the one or more databases into different user types, wherein the different user types include an interactive user type and a non-interactive user type, wherein the interactive user type is a type of user that submits queries generated directly by a human interacting with an application, wherein the non-interactive user type is a type of user that submits queries generated indirectly by a human interacting with an application, wherein one or more of the plurality of users can be classified into the same user type, and wherein a result of the classification of the plurality of users is used to detect attacks on the one or more databases.

10. The method of claim 9, wherein the user type of a user from the plurality of users is used when applying a security rule to a database access performed by the user.

11. A set of one or more non-transitory computer readable storage media storing instructions which, when executed by one or more processors of one or more electronic devices implementing a security system, cause the one or more electronic devices to perform operations for detecting attacks on one or more databases hosted by one or more database servers, the operations comprising:
classifying, based on analyzing database logs of the one or more databases, each of a plurality of network entities used to access the one or more databases over database connections established by the plurality of network entities with the one or more databases into one of a plurality of network entity types;
using a result of the classification of the plurality of network entities to detect attacks on the one or more databases by applying different sets of security rules to different accesses to the one or more databases depending on the network entity types of the network entities used to perform the different accesses; and
classifying, based on analyzing the database logs of the one or more databases, a plurality of operating system (OS) accounts used to access the one or more databases into different OS account types, wherein the different OS account types include a human OS account type and a service OS account type, wherein the human OS account type is a type of OS account that is designated to be used by a human interacting with the OS, wherein the service OS account type is a type of OS account that is designated to be used by an application interacting with the OS, wherein one or more of the plurality of OS accounts can be classified into the same OS account type, and wherein a result of the classification of the plurality of OS accounts is used to detect attacks on the one or more databases.

12. The set of one or more non-transitory computer readable storage media of claim 11, wherein the plurality of network entity types includes a personal client entity type, a jump server entity type, an application server entity type, and a database server entity type.

13. The set of one or more non-transitory computer readable storage media of claim 11, wherein the classifying each of the plurality of network entities is based on one or more of the following features determined from analyzing the database logs: applications used to access a database, operating system (OS) account types used to access a database, OS account activity, Internet Protocol (IP) address activity, IP address convention, number of queries, and existence of predefined keywords.

14. The set of one or more non-transitory computer readable storage media of claim 11, wherein the classifying each of the plurality of network entities is also based on analyzing enterprise directory information maintained in an enterprise directory.

15. The set of one or more non-transitory computer readable storage media of claim 11, wherein the classifying each of the plurality of network entities is also based on clustering the plurality of network entities into groups based on host name and assigning the same network entity type to network entities clustered into the same group.

16. An electronic device configured to detect attacks on one or more databases hosted by one or more database servers, the electronic device comprising:
one or more processors; and
a non-transitory machine-readable storage medium having instructions stored therein, which when executed by the one or more processors, cause the electronic device to:
classify, based on analyzing database logs of the one or more databases, each of a plurality of network entities used to access the one or more databases over database connections established by the plurality of network entities with the one or more databases into one of a plurality of network entity types;
use a result of the classification of the plurality of network entities to detect attacks on the one or more databases by applying different sets of security rules to different accesses to the one or more databases depending on the network entity types of the network entities used to perform the different accesses; and classify, based on analyzing the database logs of the one or more databases, a plurality of operating system (OS) accounts used to access the one or more databases into different OS account types, wherein the different OS account types include a human OS account type and a service OS account type, wherein the human OS account type is a type of OS account that is designated to be used by a human interacting with the OS, wherein the service OS account type is a type of OS account that is designated to be used by an application interacting with the OS, wherein one or more of the plurality of OS accounts can be classified into the same OS account type, and wherein a result of the classification of the plurality of OS accounts is used to detect attacks on the one or more databases.

17. The electronic device of claim 16, wherein the plurality of network entity types includes a personal client entity type, a jump server entity type, an application server entity type, and a database server entity type.

18. The electronic device of claim 16, wherein the classification of the plurality of OS accounts is also based on analyzing enterprise directory information maintained in an enterprise directory.

* * * * *